(12) United States Patent
Ferrarotti et al.

(10) Patent No.: US 11,331,629 B2
(45) Date of Patent: May 17, 2022

(54) MODULAR LIQUID DEGASSING SYSTEMS

(71) Applicant: Hamilton Sundstrand Corporation, Charlotte, NC (US)

(72) Inventors: Michael Ferrarotti, Durham, CT (US); Codrin D. Sandu, Bayside, NY (US); Aaron F. Rickis, Long Meadow, MA (US); Peter M. Ballard, Enfield, CT (US); August M. Coretto, Manchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 148 days.

(21) Appl. No.: 16/430,072

(22) Filed: Jun. 3, 2019

(65) Prior Publication Data

US 2020/0376436 A1    Dec. 3, 2020

(51) Int. Cl.
*B01D 63/04* (2006.01)
*B01D 19/00* (2006.01)

(52) U.S. Cl.
CPC ......... *B01D 63/04* (2013.01); *B01D 19/0031* (2013.01); *B01D 2313/23* (2013.01); *B01D 2319/025* (2013.01)

(58) Field of Classification Search
None
See application file for complete search history.

(56) References Cited

U.S. PATENT DOCUMENTS

| | | | | |
|---|---|---|---|---|
| 5,938,922 A | * | 8/1999 | Fulk, Jr. | B01D 63/02 210/321.81 |
| 6,149,817 A | * | 11/2000 | Peterson | B01D 19/0031 210/321.78 |
| 8,293,107 B1 | | 10/2012 | Lobovsky et al. | |

(Continued)

FOREIGN PATENT DOCUMENTS

| | | |
|---|---|---|
| EP | 3450724 A1 | 3/2019 |
| EP | 3456405 A1 | 3/2019 |

OTHER PUBLICATIONS

Extended European search report issued in corresponding EP application No. 19211156.5, dated Jun. 2, 2020.

(Continued)

*Primary Examiner* — Jason M Greene
(74) *Attorney, Agent, or Firm* — Locke Lord LLP; Scott D. Wofsy; Alicia J. Carroll

(57) ABSTRACT

A fiber bundle cartridge for a fiber membrane degassing system includes an inner sleeve including one or more perforations and a fiber bundle positioned radially outward from the inner sleeve. The fiber bundle has an annular shape defining a central bundle axis. The perforations of the inner sleeve define a plurality of inlets and/or outlets facing radially with respect to the central bundle axis. A fiber membrane degassing system includes a housing defining a cylindrical volume having at least one inlet and at least one outlet. The system includes at least one fiber within the cylindrical volume, where fluid flowing through the cylindrical volume from the at least one inlet to the at least one (Continued)

outlet flows perpendicular to a longitudinal dimension of the fiber. A method of degassing a liquid includes directing a liquid volume through a fiber bundle in a direction radial to a longitudinally extending bundle axis.

15 Claims, 2 Drawing Sheets

(56) References Cited

U.S. PATENT DOCUMENTS

| | | | |
|---|---|---|---|
| 2002/0148775 A1* | 10/2002 | Watari | B01D 19/0031 |
| | | | 210/500.23 |
| 2003/0192820 A1 | 10/2003 | Cho et al. | |
| 2012/0247337 A1* | 10/2012 | Taylor | B01D 19/0031 |
| | | | 96/6 |
| 2019/0022557 A1 | 1/2019 | Rhoden | |
| 2019/0022558 A1 | 1/2019 | Rhoden et al. | |
| 2019/0030460 A1 | 1/2019 | Herring | |
| 2019/0054423 A1 | 2/2019 | Cordatos | |
| 2019/0060787 A1 | 2/2019 | Cordatos | |
| 2020/0197858 A1* | 6/2020 | Karode | B01D 63/04 |

OTHER PUBLICATIONS

Extended European Search Report issued in corresponding EP application No. 19211156.5, dated Sep. 2, 2020.
European Communication Pursuant to Art. 94(3) EPC, dated Sep. 6, 2021, issued during the prosecution of European Patent Application No. EP 19211156.5, 6 pages.

* cited by examiner

MODULAR LIQUID DEGASSING SYSTEMS

BACKGROUND

1. Field

The present disclosure relates to fluid degassing systems, more specifically to fiber degassing systems (e.g., for fuel degassing such as deoxygenation).

2. Description of Related Art

Gas turbine engines operate more efficiently at higher system and fuel temperatures. As a result, increased thermal loads and decreased fuel flows anticipated for next generation aircraft will cause higher temperature fuel considering fuel is used as a heat sink. However, when exposed to higher temperatures hydrocarbon fuels tend to form carbonaceous deposits (coke) on fuel wetted components due to the presence of dissolved oxygen, hence fuel stabilization will be required in order to meet performance, engine life and operability targets. Coke is a solid residue created when fuels see oxidative and thermal breakdown at high temperature. Reduction or removal of oxygen in the fuel significantly decreases coke at high fuel temperatures, which allows gas turbines to operate at higher temperatures. One way to remove dissolved oxygen from fuel (the root cause of deposits) is by means of a membrane-based fuel deoxygenator.

Such conventional methods and systems have generally been considered satisfactory for their intended purpose. However, there is still a need in the art for improved liquid degassing systems. The present disclosure provides a solution for this need.

SUMMARY

A fiber bundle cartridge for a fiber membrane degassing system includes an inner sleeve including one or more perforations and a fiber bundle positioned radially outward from the inner sleeve. The fiber bundle has an annular shape that defines a central bundle axis. The perforations of the inner sleeve define at least one of a plurality of inlets or a plurality of outlets facing radially with respect to the central bundle axis.

In some embodiments, the cartridge includes an outer sleeve that defines one or more outer sleeve perforations. The outer sleeve can be positioned radially outward from the fiber bundle. The outer sleeve perforations can define at least one of a plurality of inlets or a plurality of outlets facing radially with respect to the central bundle axis. The fiber bundle can include at least one fiber extending parallel to the central bundle axis.

The cartridge can include an additional inner sleeve and an additional fiber bundle positioned radially outward from the additional inner sleeve. The additional fiber bundle can have an annular shape defining central bundle axis. The perforations of the additional inner sleeve can define at least one of a plurality of inlets or a plurality of outlets facing radially with respect to the central bundle axis of the additional fiber bundle. The cartridge can include a metal barrier positioned between the inner sleeve and the additional inner sleeve.

The additional inner sleeve and the additional fiber bundle can be positioned radially inward from the outer sleeve. The cartridge can define a cartridge flow path defined between an interior cavity of the inner sleeve an interior cavity of the additional inner sleeve. The additional fiber bundle can be downstream from the inner sleeve and the fiber bundle along the cartridge flow path. The additional fiber bundle can be upstream from the additional inner sleeve along the cartridge flow path.

The one or more outer sleeve perforations can include two sets of perforations. A first of the two sets of perforations can be at a common axial position with the fiber bundle. A second of the two sets of perforations can be at a second common axial position with the additional fiber bundle. The second of the two sets of perforations can be downstream from the first of the two sets.

In accordance with another aspect, a fiber membrane degassing system includes a housing defining a cylindrical volume having at least one inlet and at least one outlet. The system includes at least one fiber positioned within the cylindrical volume such that fluid flowing through the cylindrical volume from the at least one inlet to the at least one outlet flows perpendicular to a longitudinal dimension of the at least one fiber.

In some embodiments, the housing is an outer housing radially outward from the at least one fiber. The at least one inlet and the at least one outlet can be axially facing. The outer housing can define a system flow path between the axially facing inlet and the axially facing outlet. The at least one fiber can be positioned within a fiber bundle cartridge positioned within the cylindrical volume. The cartridge can include an inner sleeve including one or more perforations. The at least one fiber can form a fiber bundle having an annular shape defining a central bundle axis. The perforations of the inner sleeve can define at least one of a plurality of inlets or a plurality of outlets facing radially with respect to the central bundle axis.

The cartridge can include an outer sleeve defining one or more outer sleeve perforations. The outer sleeve can be positioned radially outward from the fiber bundle. The outer sleeve perforations can define at least one of a plurality of inlets or a plurality of outlets facing radially with respect to the central bundle axis.

The cartridge can include an additional inner sleeve and an additional fiber bundle positioned radially outward from the additional inner sleeve. The additional fiber bundle can have an annular shape defining central bundle axis. The perforations of the additional inner sleeve can be similar to those of the inner sleeve described above. The additional fiber bundle can be downstream from the inner sleeve and the fiber bundle along a system flow path defined between the inlet and the outlet of the housing. The cartridge can include a metal barrier positioned between the inner sleeve and the additional inner sleeve. The cartridge can include an outer sleeve defining one or more outer sleeve perforations. The inner sleeve, the fiber bundle, the additional inner sleeve and the additional fiber bundle can be positioned radially inward from the outer sleeve. A longitudinal axis can be defined between the inlet and the outlet of the housing. The one or more outer sleeve perforations can include two sets of perforations. A first of the two sets of perforations can be at a common axial position relative to the longitudinal axis with the fiber bundle. A second of the two sets of perforations can be at a second common axial position relative to the longitudinal axis with the additional fiber bundle.

In accordance with another aspect, a method of degassing a liquid includes directing a liquid volume through a fiber bundle in a direction radial to a longitudinally extending bundle axis.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
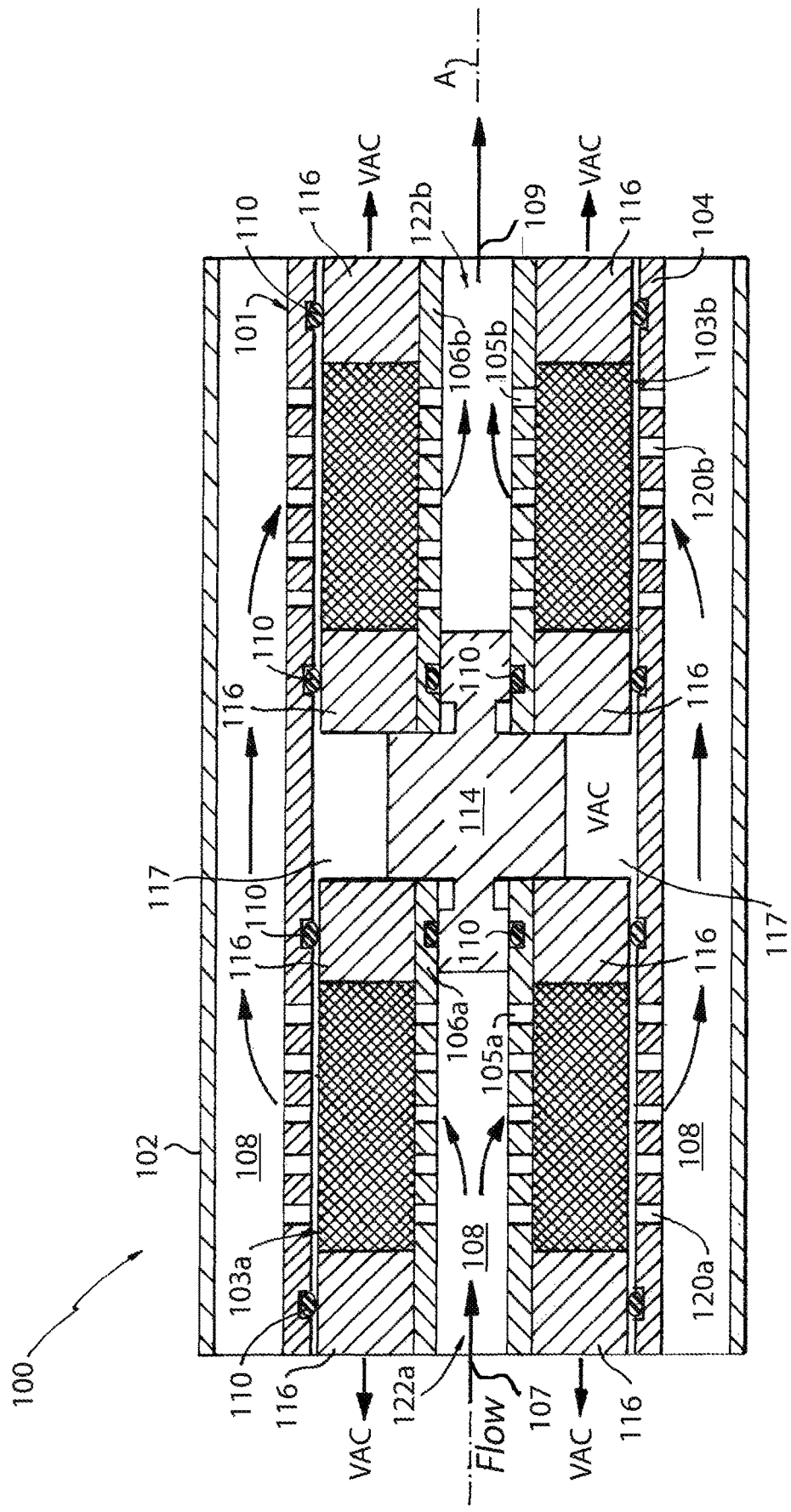
FIG. 1 is a schematic cross-sectional view of an embodiment of a modular fiber membrane degassing system constructed in accordance with the present disclosure, showing a fiber bundle cartridge.

Reference will now be made to the drawings wherein like reference numerals identify similar structural features or aspects of the subject disclosure. For purposes of explanation and illustration, and not limitation, an illustrative view of an embodiment of a modular fiber membrane degassing system in accordance with the disclosure is shown in FIG. 1 and is designated generally by reference character 100. Other embodiments of systems in accordance with the disclosure, or aspects thereof, are provided in FIG. 2 as will be described. The systems and methods described herein can be used provide modular degassing systems (e.g., for aircraft fuel deoxygenation systems), for example. The modular design allows a standardized fiber bundle to be used in multiple applications, where the number of bundles is selected based on application and need.

As shown in FIG. 1, a modular fiber membrane degassing system 100 includes an outer housing 102 and a system flow path 108 defined within the interior of outer housing 102. Outer housing 102 is shown as a generally hollow cylindrical outer housing 102, but could have a variety of suitable shapes. The system 100 is shown with an inlet 107 and an outlet 109 and a fiber bundle cartridge 101 positioned between inlet 107 and outlet 109. The fiber bundle 103 can include a single fiber wrapped many times, or a plurality of fibers. A longitudinal axis A is defined between inlet 107 and outlet 109 of the system flow path 108. The outer housing 102 is radially outward from the fiber bundle cartridge 101 and system flow path 108.

With continued reference to FIG. 1, cartridge 101 includes inner sleeves 106a and 106b, having generally hollow cylindrical shapes and each including a plurality of perforations 105a and 105b, respectively. Cartridge 101 includes an outer sleeve 104, which also has a generally hollow cylindrical shape, defining one or more outer sleeve perforations 120a and 120b. Cartridge 101 includes fiber bundles 103a and 103b each positioned radially outward from respective inner sleeves 106a and 106b. Annular epoxy layers 116 are positioned axially on either side of each fiber bundle 103a and 103b. For epoxy layers 116 that are adjacent to an epoxy layer around another fiber bundle, a vacuum area 117 is positioned between the adjacent annular epoxy layers 116. Annular seals 110 are positioned between the epoxy layers 116 and their respective abutting inner and outer sleeves 106a, 106b, and 104. For ease of reference, fiber bundle 103b is sometimes referred to as additional fiber bundle 103b throughout this description. Additional fiber bundle 103b is downstream from inner sleeve 106a and fiber bundle 103a along system flow path 108. Inner sleeve 106a, fiber bundle 103a, additional inner sleeve 106b and additional fiber bundle 106b are positioned radially inward from outer sleeve 104.

Each fiber bundle 103a and 103b defines an annular shape defining a central bundle axis, which, in the embodiment of FIG. 1, aligns with longitudinal axis A of system 100 and cartridge 101. While the annular shape of each fiber bundle 103a and 103b is shown by fibers wrapped circumferentially (in a generally circular or helical manner) about longitudinal axis A, each fiber bundle can be formed by longitudinally extending fibers, as shown in FIG. 2.

Figure 2:
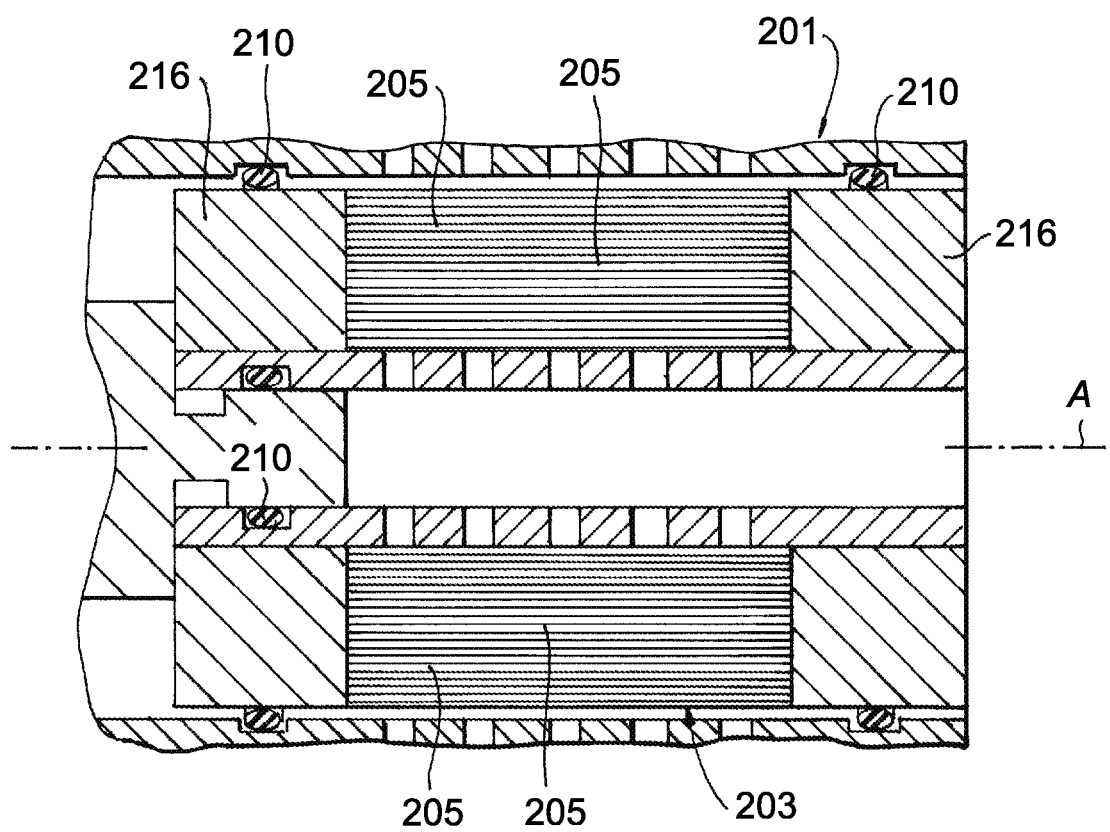
FIG. 2 is a schematic cross-sectional view of a portion of another embodiment of a modular fiber membrane degassing system constructed in accordance with the present disclosure, showing a portion of a fiber bundle cartridge having axially extending fibers.

With reference now to FIG. 2, a portion of another embodiment of a cartridge 201 is shown. Cartridge 201 is the same as cartridge 101 except that each fiber 205 extends substantially parallel to longitudinal axis A between epoxy 216 and would be positioned about longitudinal axis A in conjunction with other fibers to form a fiber bundle 203 in an annular shape. Cartridge 201 includes annular seals 210 and can similarly be separated from another cartridge by metal barrier, e.g. metal barrier 114. Cartridge 201 can include a sleeve, similar to sleeve 104, and can be used within the outer housing 102 of system 100, similar to how cartridge 101 is arranged within system 100. Fiber bundle 203 can also be made from a single fiber 205 that is axially extending with turns at the axial ends proximate to the epoxy 216. Those skilled in the art will readily appreciate that a "fiber" can be a single strand of material or a series of strands of material wound together to form a single fiber, like fiber 205 (or like one of the fibers of bundle 101a/101b). The fiber can then be axially positioned, as shown in FIG. 2, or wrapped in a circular/helical manner as shown in the fiber bundle of FIG. 1.

As shown in FIG. 1, perforations 105a of inner sleeve 106a define a plurality of inlets into fiber bundle 103a. Perforations 105a face radially with respect to the central bundle axis, which is shown as longitudinal axis A in FIG. 1, which acts to guide fluid flow radially through bundle 103a to outlets 120a of outer sleeve 104. By directing fluid flow radially, rather than axially as with traditional systems, the pressure drop across the bundle is reduced. The system inlet and outlet, however, e.g. inlet and outlet 107 and 109, respectively, remain axially oriented for ease of installation. Outlets 120a of outer sleeve 104 face radially with respect to the central bundle axis. Perforations 105b of inner sleeve 106b define a plurality of outlets out of fiber bundle 103b. Perforations 105b face radially with respect to the central bundle axis, which acts to guide fluid flow from inlets 120b of outer sleeve 104 through to an interior cavity 122b of additional inner sleeve 106b. The forced radially flow paths between inner sleeves 106a and 106b and outer sleeve 104 keeps fuel in a given one of the fiber bundles 103a and 103b, which in turn, promotes oxygen removal while significantly reducing pressure drop (as compared with traditional systems where the pressure drop is, in some cases, too high for fuel applications). Inlets 120b of outer sleeve 104 face radially with respect to the central bundle axis. Cartridge 101 includes a metal barrier 114, e.g. a spacer 114, positioned axially between inner sleeve 106a and additional inner sleeve 106b such that flow entering through inner sleeve 106a and exiting through 106b must pass through fiber bundle 103a, along flow path 108, and back through fiber bundle 103*b*. Annular seals 110 can be positioned between the metal barrier 114 and inner sleeves 106*a* and 106*b*.

With continued reference to FIG. 1, inner sleeves 106*a* and 106*b* and fiber bundles 103*a* and 103*b* are positioned radially inward from outer sleeve 104. Each cartridge 101 defines a cartridge flow path, which is the portion of system flow path 108 that is within the inner diameter of outer sleeve 104. System flow path 108 is at least partially defined within interior cavities 122*a* and 122*b* of inner sleeves 106*a* and 106*b*. At least a portion of the cartridge flow path is defined between an interior cavity 122*a* of inner sleeve 106*a* and an interior cavity 122*b* of additional inner sleeve 106*b*. Fiber bundle 103*b* is downstream from inner sleeve 106*a* and fiber bundle 103*b* along cartridge flow path 108. Additional fiber bundle 103*b* is upstream from additional inner sleeve 106*b* along cartridge flow path 108, meaning that fluid flow goes from fiber bundle 103*b* and travels radially inward to interior cavity 122*b*.

As shown in FIG. 1, the one or more outer sleeve 104 perforations includes two sets of perforations, wherein a first of the two sets of perforations, denoted by perforations 120*a* is at a common axial position relative to longitudinal axis A with fiber bundle 103*a*. A second of the two sets of perforations, denoted by perforations 120*b*, is at a second common axial position relative to longitudinal axis A with additional fiber bundle 103*b*. The second of the two sets of perforations 120*b* is downstream from the first of the two sets 120*a*. This allows fluid to flow from interior cavity 122*a*, radially outward through fiber bundle 103*a* and through perforations 120*a*. The system flow path 108 then travels axially within the generally annular space between outer housing 102 and outer sleeve 104, and back radially inward through perforations 120*b* through additional fiber bundle 103*b* and through outlets 105*b*. Those skilled in the art will readily appreciate that a number of cartridges 101 could be used in system 100. For example, there could be another cartridge positioned upstream or downstream from cartridge 101. Moreover, cartridge 101 can have a single fiber bundle 103*a* and single inner sleeve 106*a*, or multiple fiber bundles 103*a* and inner sleeves 106*a* and 106*b*, as shown. For example, a single outer sleeve 104 could have three fiber bundles and three inner sleeves associated therewith. The use of outer sleeve 104, inner sleeves 106*a* and 106*b*, and metal barrier 114 maintain vacuum area 117 through multiple axial fiber bundles 103*a* and 103*b*. When stacking multiple bundles, e.g. additional bundles similar to 103*a* and 103*b*, similar vacuum cavities 117 are maintained between each bundle using the architecture of the inner and outer sleeves with a spacer, e.g. barrier 114, and seals, e.g. seals 110.

The methods and systems of the present disclosure, as described above and shown in the drawings, provide for degassing systems with superior properties including ease of manufacturability, installation, and/or replacement. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fiber bundle cartridge for a fiber membrane degassing system, the fiber bundle cartridge comprising:
   an inner sleeve including one or more perforations;
   a fiber bundle positioned radially outward from the inner sleeve, the fiber bundle having an annular shape defining a central bundle axis, wherein the perforations of the inner sleeve define at least one of a plurality of inlets or a plurality of outlets facing radially with respect to the central bundle axis;
   an outer sleeve defining one or more outer sleeve perforations, wherein the outer sleeve is positioned radially outward from the fiber bundle; and
   an additional inner sleeve and an additional fiber bundle positioned radially outward from the additional inner sleeve, wherein the additional fiber bundle has an annular shape defining central bundle axis, wherein the perforations of the additional inner sleeve define at least one of a plurality of inlets or a plurality of outlets facing radially with respect to the central bundle axis of the additional fiber bundle, wherein the additional inner sleeve and the additional fiber bundle are positioned radially inward from the outer sleeve.

2. The fiber bundle cartridge as recited in claim 1, wherein the outer sleeve perforations define at least one of a plurality of inlets or a plurality of outlets facing radially with respect to the central bundle axis.

3. The fiber bundle cartridge as recited in claim 1, wherein the fiber bundle includes at least one fiber extending parallel to the central bundle axis.

4. The fiber bundle cartridge as recited in claim 1, further comprising a metal barrier positioned between the inner sleeve and the additional inner sleeve.

5. The fiber bundle cartridge as recited in claim 1, further comprising a cartridge flow path defined between an interior cavity of the inner sleeve an interior cavity of the additional inner sleeve.

6. The fiber bundle cartridge as recited in claim 5, wherein the additional fiber bundle is downstream from the inner sleeve and the fiber bundle along the cartridge flow path.

7. The fiber bundle cartridge as recited in claim 5, wherein the additional fiber bundle is upstream from the additional inner sleeve along the cartridge flow path.

8. The fiber bundle cartridge as recited in claim 1, wherein the one or more outer sleeve perforations includes two sets of perforations, wherein a first of the two sets of perforations is at a common axial position with the fiber bundle, and wherein a second of the two sets of perforations is at a second common axial position with the additional fiber bundle, wherein the second of the two sets of perforations is downstream from the first of the two sets.

9. A fiber membrane degassing system, comprising:
   a housing defining a cylindrical volume having at least one inlet and at least one outlet; and
   at least one fiber positioned within the cylindrical volume such that fluid flowing through the cylindrical volume from the at least one inlet to the at least one outlet flows perpendicular to a longitudinal dimension of the at least one fiber, wherein the at least one fiber is positioned within a fiber bundle cartridge positioned within the cylindrical volume, wherein the at least one fiber forms a fiber bundle having an annular shape defining a central bundle axis wherein the cartridge includes:
      an outer sleeve defining one or more outer sleeve perforations, wherein the outer sleeve is positioned radially outward from the fiber bundle,
      wherein the cartridge includes an inner sleeve including one or more perforations, wherein the perforations of the inner sleeve define at least one of a plurality of inlets or a plurality of outlets facing radially with respect to the central bundle axis, wherein the cartridge includes an additional inner sleeve and an additional fiber bundle positioned radially outward from the additional inner sleeve, wherein the additional fiber bundle has an annular shape defining central bundle axis, wherein the perforations of the additional inner sleeve define at least one of a plurality of inlets or a plurality of outlets facing radially with respect to the central bundle axis of the additional fiber bundle, wherein the inner sleeve, the fiber bundle, the additional inner sleeve and the additional fiber bundle are positioned radially inward from the outer sleeve.

10. The system as recited in claim 9, wherein the housing is an outer housing radially outward from the at least one fiber, wherein the at least one inlet and the at least one outlet are axially facing, and wherein the outer housing defines a system flow path between the axially facing inlet and the axially facing outlet.

11. The system as recited in claim 9, wherein the outer sleeve perforations define at least one of a plurality of inlets or a plurality of outlets facing radially with respect to the central bundle axis.

12. The system as recited in claim 9, wherein the additional fiber bundle is downstream from the inner sleeve and the fiber bundle along a system flow path defined between the inlet and the outlet of the housing.

13. The system as recited in claim 9, wherein the cartridge includes a metal barrier positioned between the inner sleeve and the additional inner sleeve.

14. The system as recited in claim 9, wherein a longitudinal axis is defined between the inlet and the outlet of the housing, wherein the one or more outer sleeve perforations includes two sets of perforations, wherein a first of the two sets of perforations is at a common axial position relative to the longitudinal axis with the fiber bundle, and wherein a second of the two sets of perforations is at a second common axial position relative to the longitudinal axis with the additional fiber bundle.

15. A method of degassing a liquid, the method comprising:
   directing a liquid volume through a fiber bundle having an annular shape in a direction radial to a longitudinally extending bundle axis, wherein the fiber bundle is positioned radially inward from an outer sleeve defining one or more outer sleeve perforations,
   wherein the cartridge includes an inner sleeve including one or more perforations, wherein the perforations of the inner sleeve define at least one of a plurality of inlets or a plurality of outlets facing radially with respect to the central bundle axis, wherein the cartridge includes an additional inner sleeve and an additional fiber bundle positioned radially outward from the additional inner sleeve, wherein the additional fiber bundle has an annular shape defining central bundle axis, wherein the perforations of the additional inner sleeve define at least one of a plurality of inlets or a plurality of outlets facing radially with respect to the central bundle axis of the additional fiber bundle, wherein the inner sleeve, the fiber bundle, the additional inner sleeve and the additional fiber bundle are positioned radially inward from the outer sleeve.

* * * * *